United States Patent Office 3,185,593
Patented May 25, 1965

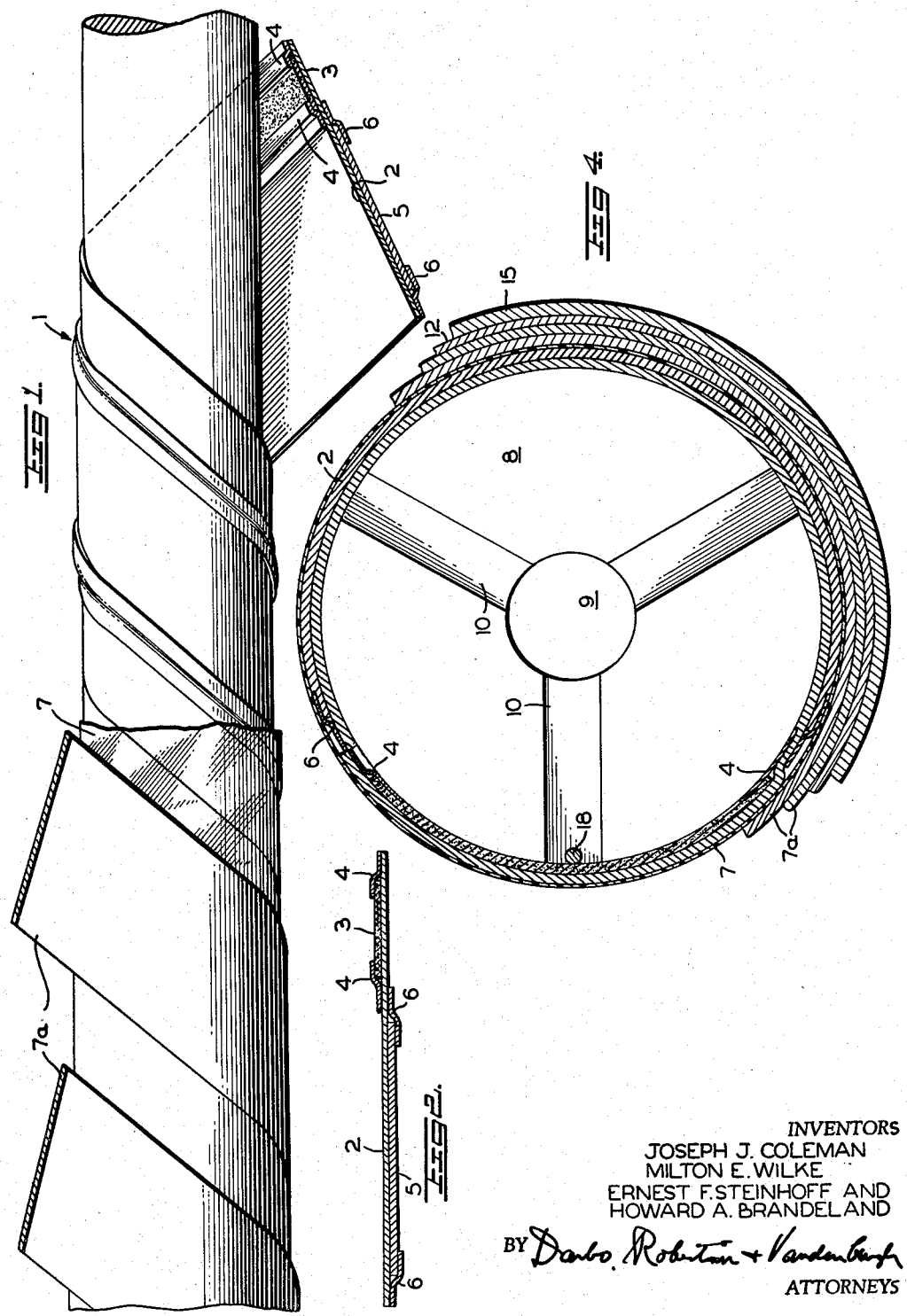

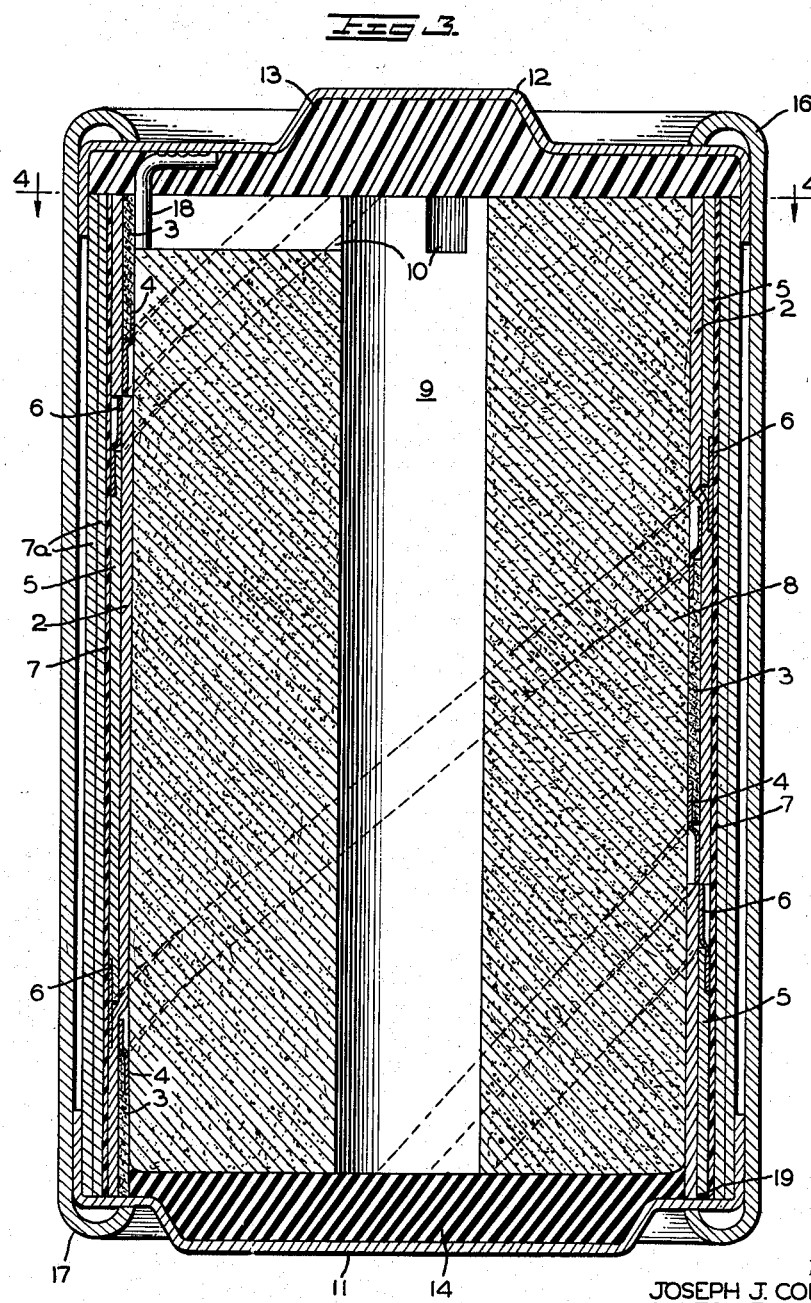

3,185,593
PRIMARY VOLTAIC CELL HAVING SPIRALLY WOUND ELECTRODES AND METHOD OF MAKING SAME
Joseph J. Coleman, Milton E. Wilke, Ernest F. Steinhoff, and Howard A. Brandeland, all of Freeport, Ill., assignors to Servel, Inc., Evansville, Ind., a corporation of Delaware
Filed Mar. 16, 1962, Ser. No. 180,225
12 Claims. (Cl. 136—107)

This invention relates to primary voltaic cells, and more particularly refers to primary dry cells having a combination container and electrode-separator assembly formed from spirally-wound elements.

Dry cells, and particularly those of the Leclanché type, have traditionally comprised a cylindrical zinc can, an electrolyte-containing separator adjacent the inner wall of the can in the form either of a starch paste layer or a starch-paste-coated paper tube, a cylindrical slug of depolarizing mix in contact with the separator, and a cylindrical carbon rod axially positioned in the depolarizer mix acting as a cathode current collector.

More recently, dry cells, and especially those containing an alkaline electrolyte, have been developed of the so-called "inside-out" type. Such cells generally have an outer container composed either of paper or steel lined with a resinous electrically-conductive carbon-containing coating. A cylindrical slug of depolarizer mix is positioned within the container in contact with the resinous electrically-conducting coating. Positioned axially within the depolarizer slug is the zinc anode, generally in the form of radially oriented vanes covered by a paper electrolyte-containing separator.

Although the prior art primary dry cells both of the traditional Leclanché construction and of the inside-out construction have offered satisfactory performance, their fabrication and assembly is rather costly, and they are very susceptible to leaking.

It is an object of the invention to provide a primary dry cell having a preformed sub-assembly comprised of a container, an anode, a bibulous separator, and a cathode current collector.

It is a further object of the invention to provide a dry cell which is less susceptible to leaking.

It is still further an object to provide a combination container, anode, and cathode current collector for a primary dry cell which may be easily fabricated by spirally winding pre-formed strips containing the enumerated elements over a mandrel.

It is a further object to provide a novel dry cell construction which is extremely conservative of space.

Other objects and advantages of the invention will become apparent from a study of the following description and drawings in which:

FIG. 1 is a plan view showing the container-electrode assembly of the invention being spirally wound on a mandrel;

FIG. 2 is a cross-sectional view of the ribbon being wound in FIG. 1;

FIG. 3 is a cross-sectional view of a dry cell according to the invention; and

FIG. 4 is a cross-sectional view of the cell taken at the line 4—4 of FIG. 3.

The term "spiral" as used herein is to be taken in its broader sense in which it is synonymous with the term "helical," as illustrated particularly in FIG. 1, rather than in its restricted sense in which it refers to a planar figure.

According to the invention, a strip or ribbon is first prepared utilizing a bibulous material such as paper. On one surface and along one edge of the paper is placed a strip of an electro-negative metal, such, for example, as zinc. On the other surface of the paper is placed a strip of an electrically-conducting carbonaceous strip. The zinc strip and the carbon strip may be affixed to the paper separator by means of an adhesive or a pressure sensitive tape. The strip thus prepared is then spirally-wound about a mandrel having the proper diameter to form a tube in which the carbonaceous strip appears on the inside of the tube and the zinc strip on the outside. One or more layers of a water-impermeable film are then wound about the tube, and finally several layers of paper are wound about the film, forming a tube having high rigidity. A cylindrical slug of depolarizer mix is then placed within the container, and electrode terminals are placed at the ends of the tube and connected to the respective electrodes. A cell results which is considerably less costly and offers performance at least as good as that of traditional cells.

Referring to FIG. 1, the innermost ribbon 1 is shown as it is wound on a mandrel. As more clearly shown in FIG. 2, the ribbon comprises a bibulous paper strip 2 having a coating of carboxymethylcellulose thereon which paper strip serves as the electrolyte-retaining separator. Affixed to one surface of the paper strip 2 along one edge is an electrically conducting carbonaceous strip 3 of a resinous material such as polyisobutylene containing graphite dispersed therein. The electrically conducting strip 3 is affixed to the separator 2 by means of strips of tape 4. At the other surface of the paper separator 2 a zinc anode strip 5 is affixed by means of strips of tape 6. A layer of a water vapor-impermeable film 7 is placed over the inner ply, and one or more paper layers 7a are spirally wound over the pliofilm to form a substantially rigid outer container. Labels may be pasted to or lithographed over the paper layers.

The carbonaceous strip 3 and the anode strip 5 should be so arranged, as shown in FIGS. 1 and 2, that there is no substantial overlapping between them. With this arrangement a large surface area of the paper-covered anode engages the depolarizer, while the conductive strip makes direct contact engagement with the depolarizer in the remaining area. At least one of the strips should be spaced from the edge of separator strip so that when the separator is spirally wound on the mandrel with adjacent turns in abutting relationship, the edges of the anode will remain electronically insulated from the edges of the cathode current collector.

Referring to FIG. 3, an entire cell is shown in cross-section. Within the inner container structure shown in detail in FIGS. 1 and 2, is the depolarizer mix 8 in the form of a cylindrical sleeve. An axial air channel 9 is provided to act as a reservoir for any electrolyte leakage products that might be formed. Space for the channel is available without undue spacial restriction on the active cell elements because the space within the cell is so efficiently utilized. Since no central cylindrical carbon rod is required as a cathode current collector, and since the zinc anode is positioned at the periphery of the cell, an appreciable saving in space is realized. Radial connecting channels 10 provided at one end of the cell communicate with the axial channel 9 to permit leakage products formed at the periphery of the cell to migrate to the center. An anode terminal cap 11 and a positive cathode terminal cap 12 provide external electrical connection. A seal is formed by means of a bead of sealing material 13, such as an epoxy resin, placed in the positive cap, and asphalt 14 placed in the negative cap. An outer jacket 15 is placed over the cell and its edges 16, 17 are rolled over to provide a consolidating force for the cell. Electrical connection to the positive cathode cap is provided by means of metallic clip 18 of a material not affected by the electrolyte at one end to the conductive carbonaceous strip 3 and connected at the other end to the cathode cap 12 by such means as soldering. Electrical connection between the anode 5 and the negative terminal cap 11 is provided by means of a solder joint 19.

The cell is assembled by first fabricating the combination inner container-electrode assembly on a mandrel, as shown in FIGS. 1 and 2. It is advantageous to place a layer of paper over the mandrel before the strips are wound thereon. Cutting of the tube can then be accomplished while it is still on the mandrel, without injuring the mandrel. A Pliofilm sheet is then rolled over the electrode strip and one or more layers of paper, preferably an asphalt-impregnated paper, spirally rolled over the Pliofilm, and cemented together. The stock tube thus provided may then be cut to proper length.

The inside bottom of the negative terminal cap 11 is completely covered with 40-60 solder. The raw zinc edge of the tube is wet with concentrated zinc chloride solution flux, and then dipped into molten 40-60 solder to give a thin layer of solder clinging to the zinc edge. The tube is then inserted through the molten asphalt of the end cap and held in place until the bead of solder melts. The entire assembly is then removed from the hot plate and permitted to cool. A good electrical solder connection results, and a good mechanical and hermetical seal is formed by the asphalt.

The depolarizer mix may be any of those commonly used in the art. However, if a higher flash current capability is desired, a specially prepared mix, which is prepared in two steps, may be utilized. In the first step a traditional dry cell mix is prepared. Such a mix may have the following composition:

| | Parts |
|---|---|
| Manganese dioxide | 85 |
| Acetylene black (Shawinigan) | 16 |
| Sal ammoniac | 14.6 |
| Zinc chloride-sal ammoniac solution | 60 |

This solution may be blended in a pony mixer in the usual manner.

To 90 parts of the mix thus produced are added 10 parts of #110 Super Flake graphite, a large flake graphite. Mixing is limited to a total time of not more than 2 minutes, in order to prevent substantial fracture of the graphite flakes. The mix thus formed is then extruded and cut into slugs having the proper length. Slugs having a weight of from about 45 to 50 grams are suitable for use in "D" size cells.

A mix slug is placed into a container as formed above. In order to support the assembly, the container is inserted into a cavity of proper dimensions provided in a steel block. A hold down tool having a diameter permitting it to slide into the container is then inserted in order to tamp the mix slug slightly and to form the radial channels 7. A rod having a diameter of about 9/16 inch is then pushed down into the slug. This provides a very firm tamping of the mix, and forms the axial channel.

The metal clip 18 is then affixed at one end to the conductive strip 3. Solder is applied to the unsecured end. The positive cap containing a room temperature-setting epoxy resin is placed over the end of the cup, the soldered end of the clip 18 contacting a portion thereof. Heat may then be applied to the cap to form a solder connection with the clip 18. After the epoxy resin has set, the outer jacket 15 is placed over the cell and the ends 16 and 17 rolled over to complete the cell.

The cell of the invention has many advantages over prior art cells. Its electrode-separator container assembly may be easily and inexpensively fabricated. Because the cell enclosure does not depend for its strength upon the zinc anode, an amount of zinc less than half that required for conventional cells need be used. Moreover, the necessity for the expensive process of drawing the zinc into cans is avoided. A material saving in space is accomplished because both the anode and the cathode current collector are located at the periphery of the cell. This avoids either the bulky carbon rod generally used in Leclanché cells or the vane-form centrally located anodes used in the "inside-out cell" cell. Because of the saving in space, a large central axial channel may be utilized to trap fluid leakage. With the leakage contingency thus provided for, the costly outer steel jacket generally used in the so-called "leak-proof" cells is obviated.

The cells have proven to have long life under standard discharge tests, as well as good shelf life.

What is here claimed is:

1. A combination anode cathode current collector and separator for a cylindrical voltaic cell comprising a multi-element ribbon spirally wound to form a tube, said ribbon including a separator comprised of a strip of a sheet-form bibulous material, a cathode current collector comprised of a strip of an electrically conductive carbonaceous material affixed to the surface of said separator forming the inner surface of said tube and positioned at approximately one edge of said separator, and an anode comprised of a strip of an electrically conductive electro-negative metal affixed to the surface of said separator forming the outer surface of said tube and positioned at approximately the other edge of said separator, said collector and said anode each having a width substantially smaller than that of said separator, said ribbon being so wound so that its edges are in abutting relationship and at least one of said electrically conductive strips being spaced inwardly from the proximate edge of said separator strip.

2. A combination anode, cathode current collector and separator according to claim 1 wherein said cathode current collector is comprised of a resinous material having carbon particles dispersed therein.

3. A combination anode, cathode current collector and separator unit according to claim 1 wherein said anode is comprised of zinc.

4. A combination anode, cathode current collector and separator unit according to claim 1 wherein said separator is comprised of paper having a gelatinous coating thereon.

5. A combination anode, cathode current collector, separator and container wall assembly for a primary dry cell comprising a multi-ply tube having an inner ply comprised of a multi-element ribbon spirally wound to form a tube, said ribbon including a separator comprised of a strip of a sheet-form bibulous material, a cathode current collector comprised of a strip of an electrically conductive carbonaceous material affixed to the surface of said separator forming the inner surface of said inner ply and positioned at approximately one edge of said separator, and an anode comprised of a strip of an electrically conductive electro-negative metal affixed to the surface of said separator forming the outer surface of said inner ply and positioned at approximately the other edge of said separator, said collector and said anode each having a width substantially smaller than that of said separator, said ribbon being so wound that its edges are in abutting relationship and at least one of said electrically conductive strips being spaced inwardly from the proximate edge of said separator strip; an intermediate ply comprised of a film of water vapor-impermeable material coaxially arranged over said inner ply; and an outer ply comprising one or more paper layers spirally wound over said film.

6. An assembly according to claim 5 wherein said cathode current collector is comprised of a resinous material having carbon particles dispersed therein, and wherein said anode is comprised of zinc.

7. A cylindrical primary dry cell comprising a combination anode, cathode current collector, separator and container wall assembly comprising a multi-ply tube having an inner ply comprised of a multi-element ribbon spirally wound to form a tube, said ribbon including a separator comprised of a strip of a sheet-form bibulous material, a cathode current collector comprised of a strip of an electrically conductive carbonaceous material affixed to the surface of said separator forming the inner surface of said inner ply and positioned at approximately one edge of said separator, and an anode comprised of a strip of an electrically conductive electro-negative metal affixed to the surface of said separator forming the outer surface of said inner ply and positioned at approximately the other edge of said separator, said collector and said anode each having a width substantially smaller than that of said separator, said ribbon being so wound that its edges are in abutting relationship and at least one of said electrically conductive strips being spaced inwardly from the proximate edge of said separator strip; an intermediate ply comprised of a film of a water vapor-impermeable material coaxially arranged over said inner ply; and an outer ply comprised of one or more paper layers spirally wound over said film; an electrolyte contained in said separator, a cylindrical depolarizer element positioned within said multi-ply tube in contact engagement with the inner wall thereof, a positive terminal sealingly affixed to and serving as a closure for said tube at one end, and a negative terminal sealingly affixed to and serving as a closure for said tube at the other end, means for providing electrical connection between said cathode current collector and said positive terminal, and means for providing electrical connection between said anode and said negative terminal.

8. A dry cell according to claim 7 wherein said depolarizer is comprised of manganese dioxide having a minor proportion of carbon particles dispersed therein and said anode is comprised of zinc.

9. A dry cell according to claim 7 wherein said cathode current collector is comprised of a resinous material having carbon dispersed therethrough.

10. A dry cell according to claim 7 wherein said depolarizer has a minor proportion of a substantially unfractured flake graphite dispersed therethrough.

11. A dry cell according to claim 7 wherein a centrally located axial air chamber is provided in said depolarizer member for trapping leakage products.

12. A method for the production of a tubular combination anode, separator, cathode current collector, and container wall assembly which comprises forming a multi-element ribbon by affixing a strip of an electrically conductive carbonaceous material to one surface and along one edge of a separator comprised of a strip of a sheet-form bibulous material, affixing a strip of an electrically conductive electronegative metal to the other side of said separator at approximately the other edge thereof, the width of each of said carbonaceous strip and said metal strip being substantially smaller than that of said separator and at least one of said electrically conductive strips being spaced inwardly from the proximate edge of said separator strip, spirally winding the multi-element ribbon thus fabricated to form a tubular inner ply with the edges of said ribbon in abutting relationship, and spirally winding a plurality of strips of an electrically non-conductive material over said inner ply to form a plurality of outer plies.

References Cited by the Examiner
UNITED STATES PATENTS

| 912,946 | 2/09 | Eastman | 136—130.1 |
| 2,807,658 | 9/57 | Hatfield | 136—132 |

WINSTON A. DOUGLAS, *Primary Examiner.*

JOHN H. MACK, *Examiner.*